United States Patent [19]
Fukushima et al.

[11] Patent Number: 6,039,651
[45] Date of Patent: *Mar. 21, 2000

[54] FLEX PLATE AND FLYWHEEL CONFIGURATION

[75] Inventors: Hirotaka Fukushima, Hirakata; Mitsuhiko Takenaka, Neyagawa, both of Japan

[73] Assignee: Exedy Corporation, Neyagawa, Japan

[*] Notice: This patent is subject to a terminal disclaimer.

[21] Appl. No.: 09/134,334

[22] Filed: Aug. 14, 1998

Related U.S. Application Data

[62] Division of application No. 08/788,802, Jan. 23, 1997.

[30] Foreign Application Priority Data

| Feb. 9, 1996 | [JP] | Japan | 8-024151 |
| Feb. 9, 1996 | [JP] | Japan | 8-024152 |
| Feb. 9, 1996 | [JP] | Japan | 8-024153 |
| Feb. 9, 1996 | [JP] | Japan | 8-024154 |

[51] Int. Cl.[7] .................................. F16D 3/52
[52] U.S. Cl. .................. 464/98; 464/68; 192/200
[58] Field of Search ............... 464/68, 162, 51, 464/98, 99; 192/200, 70.17, 70.16

[56] References Cited

U.S. PATENT DOCUMENTS

| 4,997,408 | 3/1991 | Copeland . | |
| 5,253,740 | 10/1993 | Kohno et al. . | |
| 5,308,282 | 5/1994 | Hansen et al. | 464/68 |
| 5,366,054 | 11/1994 | Cooke et al. | 192/70.17 |
| 5,368,146 | 11/1994 | Kohno et al. . | |
| 5,392,888 | 2/1995 | Kajitani et al. | 192/70.17 |
| 5,515,745 | 5/1996 | Tsuruta et al. | 192/200 |
| 5,669,820 | 9/1997 | Fukushima | 464/98 |
| 5,685,407 | 11/1997 | Rudolph et al. . | |
| 5,695,034 | 12/1997 | Graton et al. | 464/68 |
| 5,695,035 | 12/1997 | Fukushima et al. . | |
| 5,720,665 | 2/1998 | Douman . | |
| 5,868,624 | 2/1999 | Fukushima et al. | 192/200 |

*Primary Examiner*—Lynne H. Browne
*Assistant Examiner*—Greg Binda
*Attorney, Agent, or Firm*—Shinjyu

[57] ABSTRACT

A flywheel assembly 1 includes a flexible plate 3 and a flywheel 2. The flexible plate 3 has a rigidity in a rotation direction and flexibility in a bending direction, and is coupled at its radially inner portion to a crankshaft 100. An elastic plate body of the flexible plate 3 is provided at its inner periphery with a cylindrical support portion 16 projected away from the crankshaft 100. The flywheel 2 is fixed at its outer peripheral portion to an outer peripheral portion of the flexible plate 3. The flywheel 2 is provided at its inner periphery with a cylindrical portion 13 projected toward the flexible plate 3 and radially overlapping the cylindrical support portion 16.

5 Claims, 11 Drawing Sheets

FLEX PLATE AND FLYWHEEL CONFIGURATION

This application is a division application of U.S. Ser. No. 08/788,802, filed Jan. 23, 1997.

BACKGROUND OF THE INVENTION

A. Field of the Invention

The present invention relates to a flywheel assembly, and in particular to a flywheel assembly having a flexible plate for damping a bending vibration transmitted from a crankshaft of an engine.

B. Description of the Background Art

Combustion energy from an engine is converted into a torque by the arrangement of a crankshaft in the engine in a manner well known in the art. The torque is transmitted to a flywheel, and is further transmitted to a transmission via a clutch.

The combustion process within the engine is such that the energy transmitted to the crankshaft exerts a bending force on the crankshaft. Bending of the crankshaft causes a vibration of a flywheel attached to an end of the crankshaft. A counter-force thereof is transmitted to an engine block, and is further transmitted to a body of a vehicle via an engine mount to vibrate the body. This causes noises during acceleration of the vehicle.

In order to reduce such noises during acceleration, it is necessary to reduce vibrations of the flywheel. For this purpose, flywheel assemblies have also been employed that are coupled to an end of a crankshaft via a flexible plate. The flexible plate has a high rigidity in the rotating direction (or circumferential direction) and a predetermined flexibility in the bending direction (or generally axial directions).

In the conventional flywheel assembly described above, the flywheel body is carried by the crankshaft only via the flexible plate. Therefore, it may rotate in an imbalance state when the flywheel itself is inclined with respect to its rotation axis due to bending forces.

A lower rigidity of the flexible plate can reduce the bending vibration more effectively. Particularly, it is possible to shift a resonance point from a practical operation region by reducing the rigidity of the flexible plate, and thereby noises during acceleration of the engine can be further reduced. However, the operation of a clutch usually requires a force to be exerted on the clutch assembly to disengage the clutch from transmitting torque. Typically, the disengaging force is applied in a direction that is ultimately exerted on the crankshaft of the engine. In other words, the disengaging force is generally axially oriented and is applied to a clutch assembly. The force, or release load, is then transmitted to the flywheel and the flex plate and further transmitted to the crankshaft of the flywheel. Consequently, if the rigidity of the flex plate in the axial or bending direction were excessively low, the flywheel would axially move toward the crankshaft an excessive extent during the clutch release operation, which would reduce a disengaging efficiency of the clutch.

SUMMARY OF THE INVENTION

One object of the present invention is to prevent inclination of a flywheel with respect to its rotational axis to reduce noises during acceleration.

Another object of the present invention is to reduce noises during acceleration without reducing a disengaging efficiency of the clutch.

In accordance with one aspect of the present invention, a flywheel assembly for transmitting torque from a crankshaft includes a flexible plate having a circular plate body having flexibility in a bending direction and an annular portion formed proximate an outer periphery of the flexible plate. The annular portion is offset from the circular plate body in an axial direction and extends from the circular plate body away from the crankshaft. The annular portion is formed with at least one protrusion that extends in an axial direction away from the crankshaft. A flywheel has an outer peripheral portion fixed to the annular portion such that there is an axial gap between the circular plate body and a radially inward portion of the flywheel. The outer peripheral portion of the flywheel is formed with at least one aperture located such that the protrusion extends into the aperture. The protrusion extends into the aperture in the flywheel to thereby assist in co-axially aligning the flexible plate and the flywheel.

The foregoing and other objects, features, aspects and advantages of the present invention will become more apparent from the following detailed description, when taken in conjunction with the accompanying drawings.

DESCRIPTION OF THE PREFERRED EMBODIMENTS

First Embodiment

Figure 1:
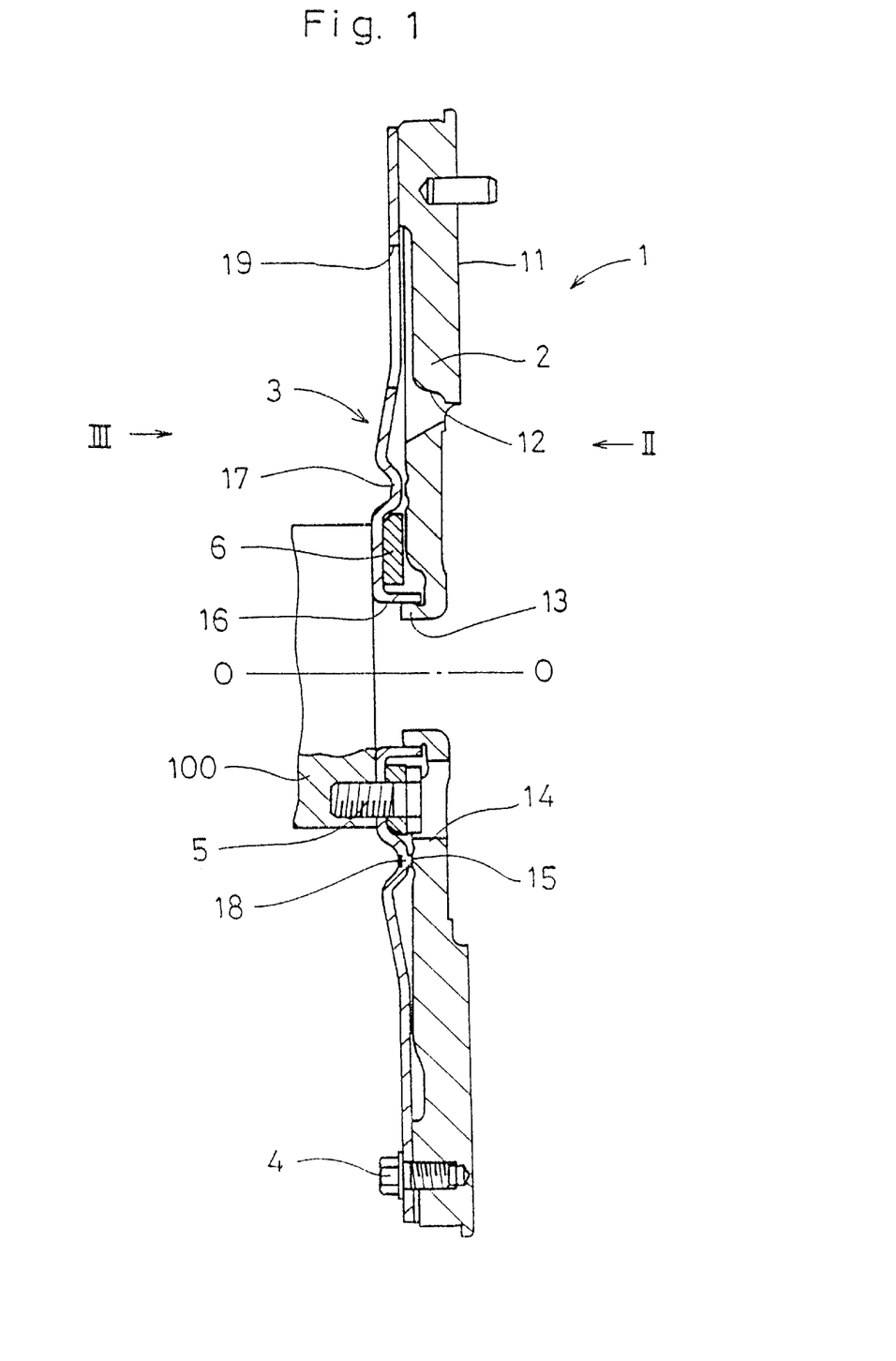
FIG. 1 is a fragmentary, schematic cross section of a flywheel assembly in accordance with a first embodiment of the present invention.
Figure 2:
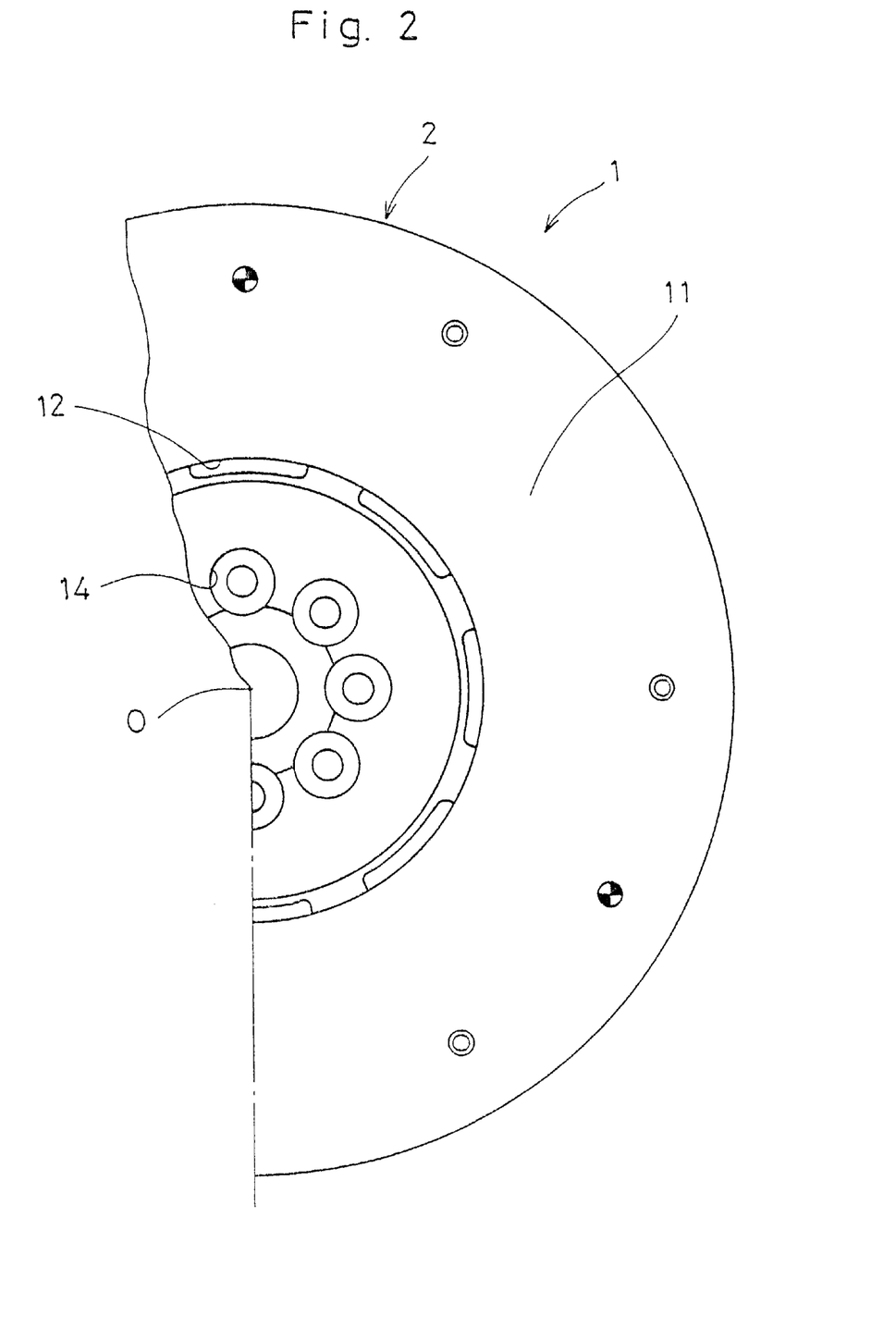
FIG. 2 is a fragmentary, elevational view of the flywheel assembly depicted in FIG. 1, looking in the direction of the arrow II in FIG. 1.

FIGS. 1 and 2 show a flywheel assembly 1 of a first embodiment of the invention. The flywheel assembly 1 is provided for transmitting a torque from a crankshaft 100 of an engine to a clutch apparatus (not shown). In FIG. 1, O—O represents a rotation axis of the flywheel assembly 1.

The flywheel assembly 1 is attached to an end of the crankshaft 100, and is basically formed of a flexible plate 3 and a flywheel 2".

Figure 4:
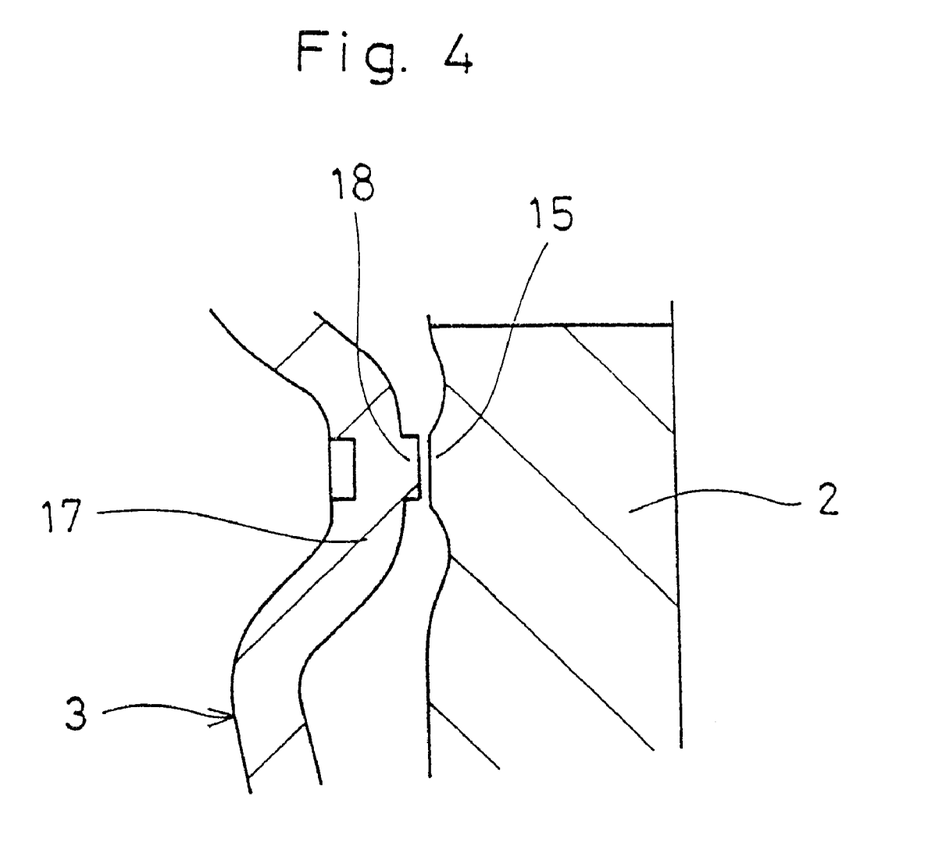
FIG. 4 is a fragmentary, cross section of a portion of the flywheel assembly depicted in FIG. 1, shown on an enlarged scale.

The flexible plate 3 is made of a circular metal sheet. An inner peripheral portion of the flexible plate 3 is fixed to an end of the crankshaft 100 by bolts 5. An annular member 6 is interposed between heads of the bolts 5 and an inner peripheral portion of the flexible plate 3. An outer peripheral portion of the flexible plate 3 is fixed to an outer peripheral portion of the flywheel 2 by a plurality of bolts 4. The flexible plate 3 has a high rigidity in the rotation direction but is flexible and elastically deformable in the bending direction. The flexible plate 3 is provided at its inner periphery with a cylindrical support portion 16 extending away from the engine, i.e., toward the flywheel 2. Also, the flexible plate 3 is provided with a drawn portion 17 which is located radially outside the bolts 5 and projects toward the flywheel 2. The drawn portion 17 has an annular form. As shown in FIG. 4, the drawn portion 17 has a plurality of extruded portions 18 extending in the circumferential direction. The extruded portions 18 project toward the flywheel 2 and have cut tip ends.

Figure 3:
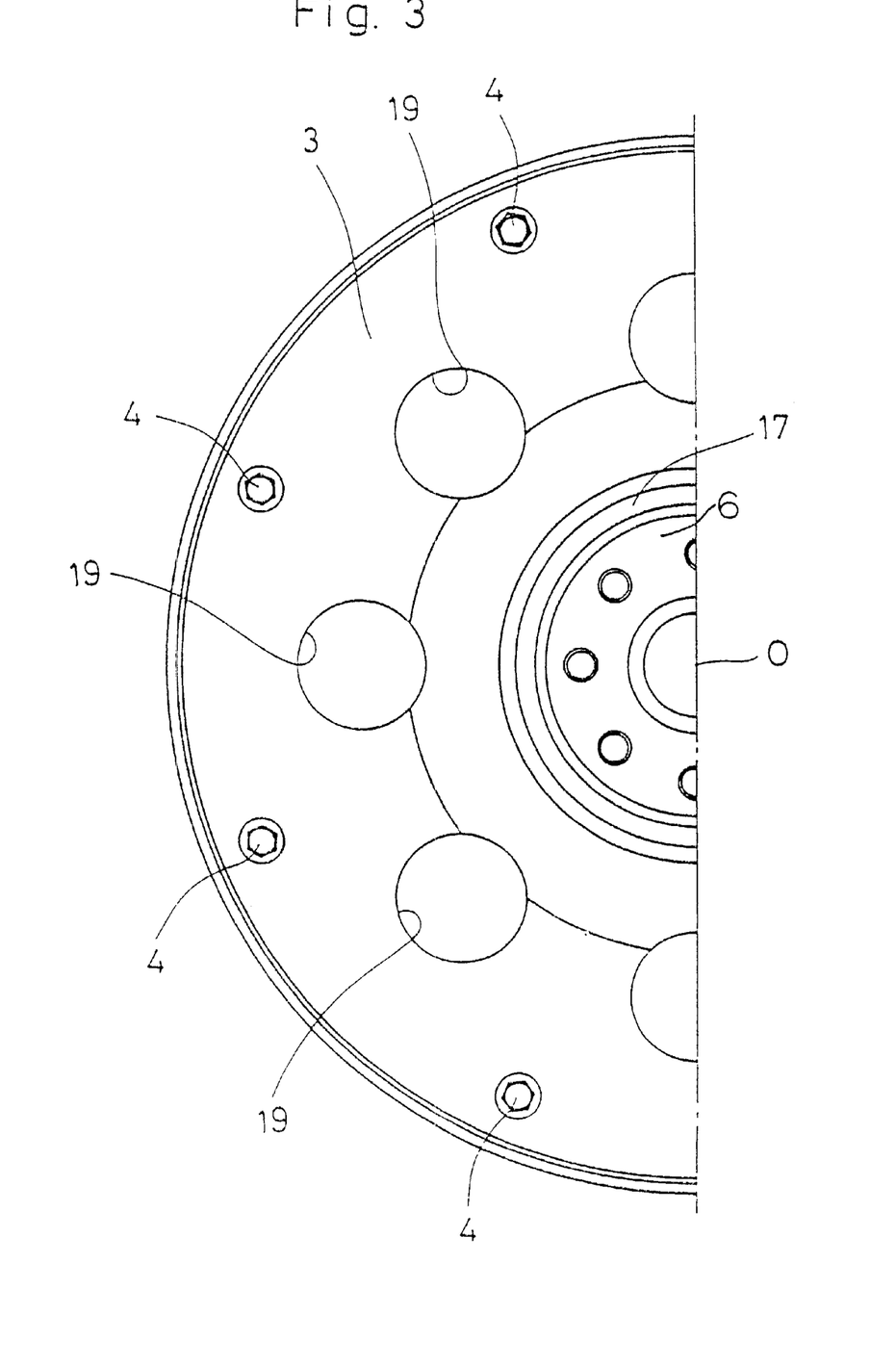
FIG. 3 is a fragmentary, elevational view of the flywheel assembly depicted in FIG. 1, looking in the direction of the arrow III in FIG. 1.

The flexible plate 3 is provided at its radially middle portion with eight circular holes 19 which are circumferentially equally spaced from each other, as shown in FIG. 3. Bending characteristics of the flexible plate 3 can be changed by changing the number, size, position, configuration and others of the circular holes 19.

The flywheel 2 is made of a substantially circular cast member. The flywheel 2 is provided at its radially outer portion with a friction surface 11, which is opposed to the transmission and is to be pressed against a friction facing (not shown) of a clutch disk assembly of the clutch apparatus. The flywheel 2 is provided with air holes 12 which are located radially inside the friction surface 11 and axially extend through the flywheel 2. Each air hole 12 extends in the circumferential direction of the flywheel 2, and has a section diverging toward the engine. The air holes 12 are formed correspondingly to the circular holes 19 of the flexible plate 3, respectively.

The flywheel 2 is further provided at a portion radially inside the air holes 12 with bolt head escape holes 14 for avoiding interference with heads of the bolts 5.

The flywheel 2 is provided at its inner peripheral portion with a cylindrical portion 13 extending toward the engine. The cylindrical portion 13 is loosely fitted into the cylindrical support portion 16. Therefore, the outer peripheral surface of the cylindrical portion 13 is in contact with or slightly spaced from the inner peripheral surface of the cylindrical support portion 16. This improves an accuracy of centering between these members. Although the cylindrical portion 13 has a spherical outer peripheral surface, it may have a cylindrical outer peripheral surface which is in contact with the cylindrical support portion 16 without a gap. Further, the flywheel 2 has an annular contact portion 15, which corresponds to the extruded portions 18 formed at the drawn portion 17, as shown in FIGS. 1 and 4.

Air which flows through air holes 12 and circular holes 19 formed at the flywheel 2 and the flexible plate 3, respectively, cools the flywheel 2. Therefore, even when friction heat is generated at the friction surface 11, the likelihood of the flywheel 2 attaining a high temperature and overheating is reduced. Therefore, it is possible to reduce abnormal wear of the friction facing and early deterioration of intended characteristics, that are typically caused by excessive heat concentrations in a flywheel.

The operation of the flywheel assembly 1 will be described below.

Damping of Bending Vibration

The crankshaft 100 receives a bending vibration due to a combustion force of the engine. When this bending vibration is transmitted to the flexible plate 3, the flexible plate 3 bends in the bending direction to cause frictional sliding between the cylindrical support portion 16 and the cylindrical portion 13, so that the bending vibration is rapidly damped. When the flexible plate 3 bends only to a small extent, the flexible plate 3 entirely bends, so that it exhibits a low rigidity. Particularly, the flexible plate 3 is thin and has the circular holes 19, so that it has a low rigidity.

When the flexible plate 3 bends to a large extent, the extruded portions 18 formed at the drawn portion 17 are partially brought into contact with the contact portion 15 of the flywheel 2. Thereafter, the flexible plate 3 bends around the contact portion 15, and exhibits a high rigidity. Owing to provision of the drawn portion 17, a portion of the flexible plate 3 which bends to the highest extent is shifted radially outward compared with a conventional structure, so that a stress is effectively dispersed radially outward compared with the conventional structure. This increases a life-time of the flexible plate 3.

Bearing of Release Load

When the release operation of the clutch apparatus (not shown) is performed, a release load acts on the flywheel 2. This moves the flywheel 2 toward the engine. Thereby, the contact portion 15 is brought into the extruded portions 18 formed at the drawn portion 17. Thereafter, the release load is transmitted from the flywheel 2 to the crankshaft 100 via the drawn portion 17. In this manner, axial movement of the flywheel 2 is significantly restricted, so that the disengaging efficiency of the clutch is improved. Further, the crankshaft can directly bear the release load, so that the flexible plate 3 can be thinner than that in the prior art. Consequently, the flexible plate 3 can have an improved function of damping the bending vibration.

Other Effects

Since the cylindrical support portion 16 of the flexible plate 3 restricts the radial movement of the rotating flywheel 2, deflective rotation which may be caused by imbalance can be suppressed. Consequently, a vibration due to the deflective rotation can be suppressed. Further, if a radially inner portion of the flexible plate 3 should be cut or broken in the vicinity of the bolt 5, the flywheel 2 will be supported by the cylindrical support portion 16, and thus will be prevented from radially disengaging the crankshaft 100.

Since the cylindrical support portion 16 and the cylindrical portion 13 are friction fitted together such that they slide with respect to one another, the flywheel 2 has an improved accuracy of centering with respect to the flexible plate 3.

According to the flywheel assembly of the invention, when a release load acts on the flywheel, the flywheel moves a predetermined distance, and then is brought into contact with the drawn portion of the flexible plate. Thereby, the flywheel is supported by the crankshaft via the projection of the flexible plate. Since the projection restricts the axial movement of the flywheel in this manner, reduction in disengaging efficiency of the clutch can be prevented.

Since the flexible plate is provided at its circular plate body with the drawn portion, stress concentrations in the flexible plate are dispersed, so that portions of the flexible plate other than the drawn portion can have a reduced thickness while suppressing breakage thereof.

According to the structure in which the circular plate body is provided at a portion radially outside the drawn portion with a plurality of holes, the portion radially outside the drawn portion can have a reduced rigidity.

According to the structure in which the drawn portion projects toward the flywheel to ensure a gap between the drawn portion and the flywheel, the drawn portion restricts the axial movement of the flywheel, so that reduction in disengaging efficiency of the clutch can be prevented.

According to the structure in which the flexible plate and the flywheel have the cylindrical support portion and the cylindrical portion radially overlapping each other, the flywheel is restricted from radially moving and inclining with respect to the flexible plate.

Second Embodiment

Figure 5:
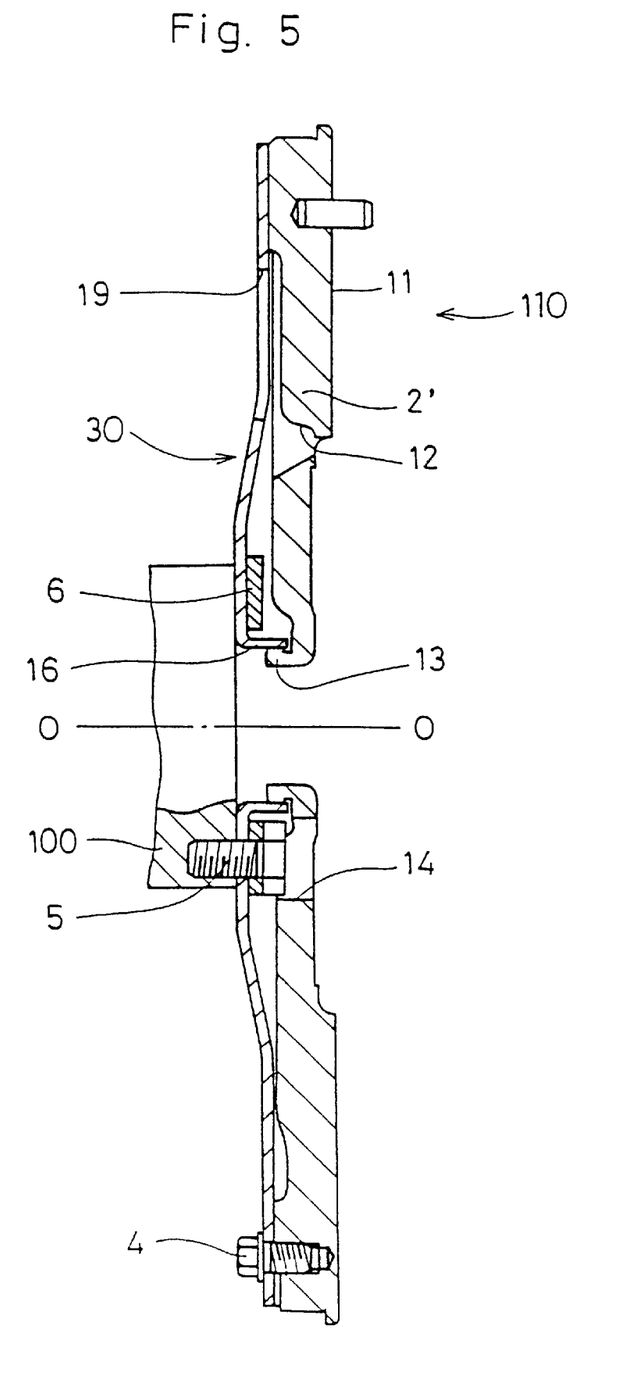
FIG. 5 is a fragmentary, schematic cross section of a flywheel assembly in accordance with a second embodiment of the present invention.

In the flywheel assembly 110 shown in FIG. 5, a drawn portion, such as the drawn portion 17 described in the first embodiment, is not formed at the flexible plate 30. Therefore, the a flywheel 2' moves toward the engine and its inner peripheral portion is brought into contact with the end of the cylindrical support portion 16 of the flexible plate 30 when a release load acts on the flywheel 2'. Thereafter, the release load is transmitted to the crankshaft 100 via the cylindrical support portion 16. Since the axial movement of the flywheel 2" is small as described above, the disengaging efficiency of the clutch is improved.

Third Embodiment

Figure 6:
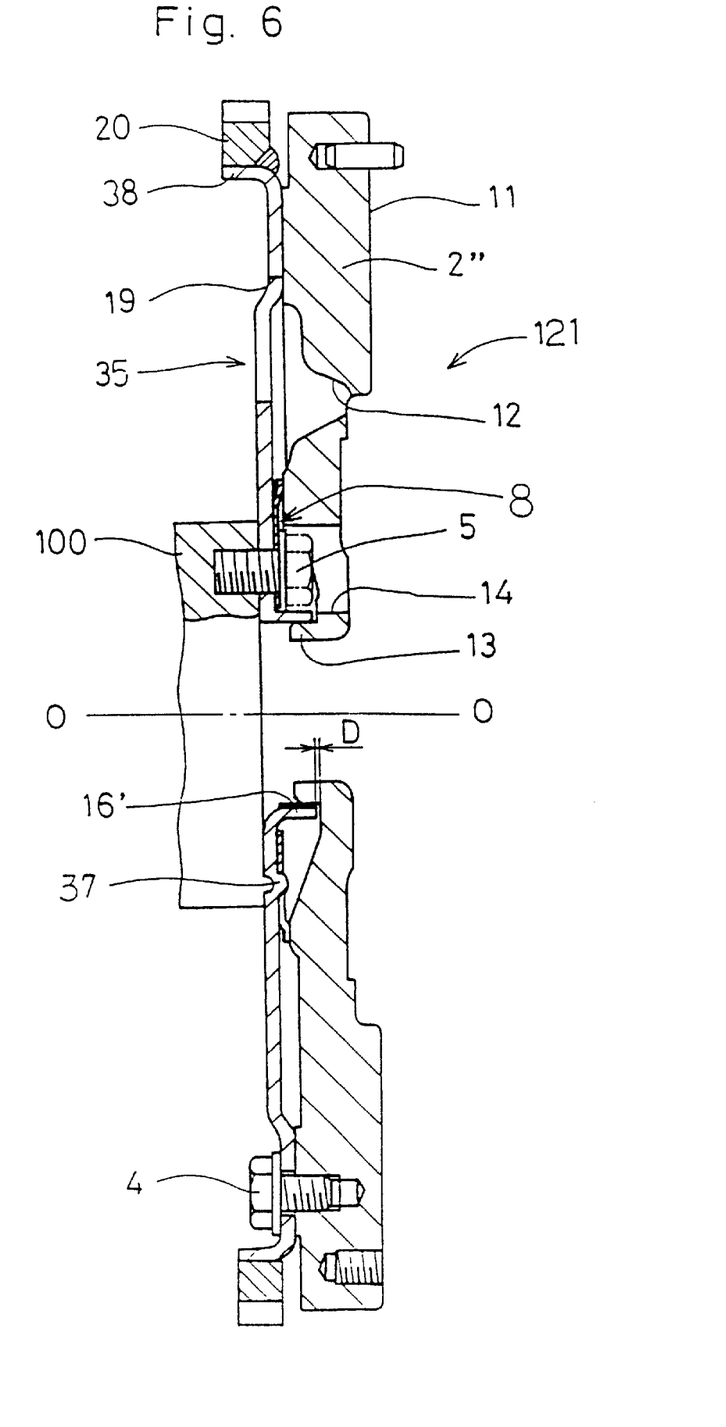
FIG. 6 is a fragmentary schematic cross section of a flywheel assembly in accordance with a third embodiment of the present invention.
Figure 7:
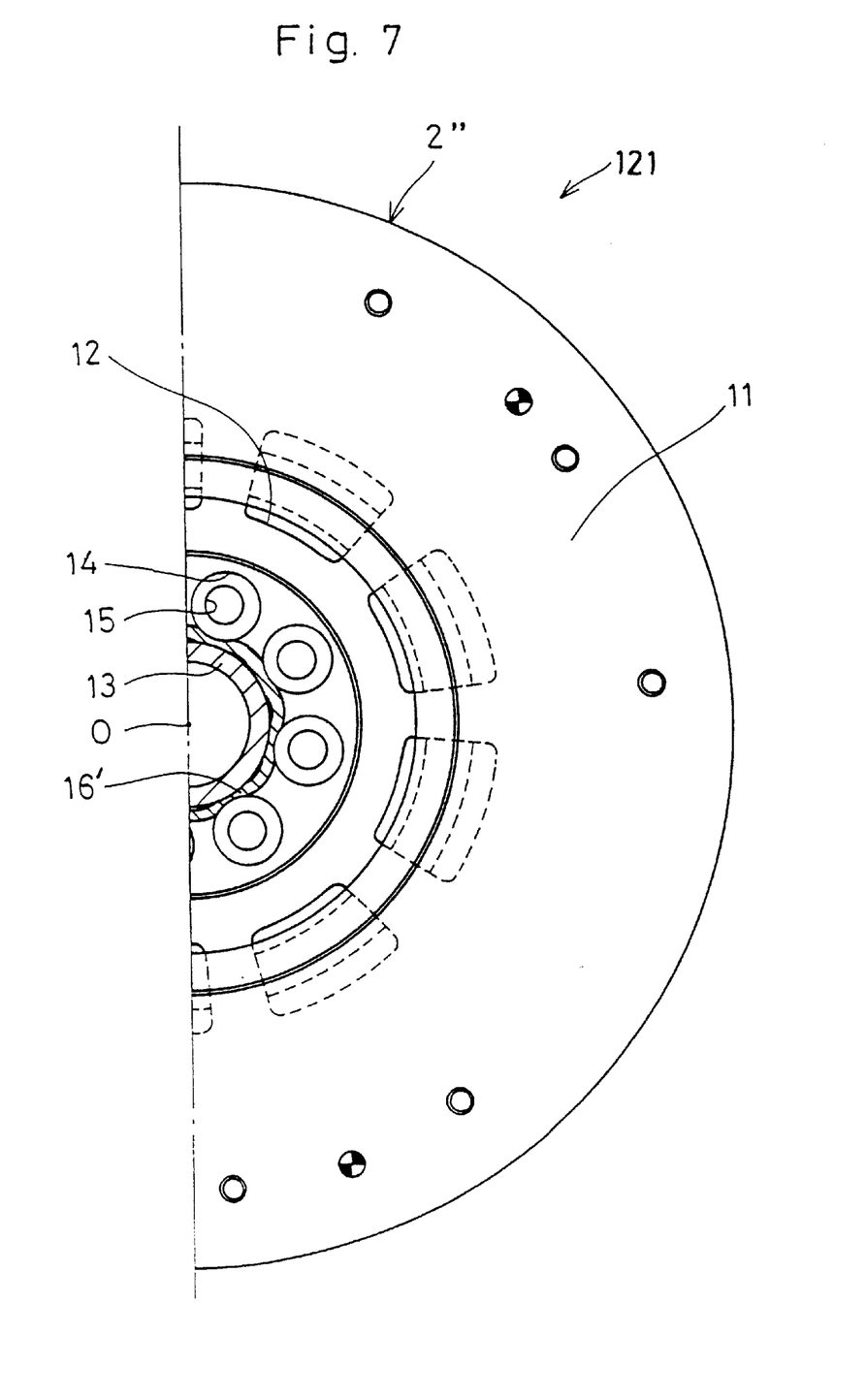
FIG. 7 is a fragmentary, elevational view, similar to FIG. 2, showing the flywheel assembly depicted in FIG. 6.
Figure 8:
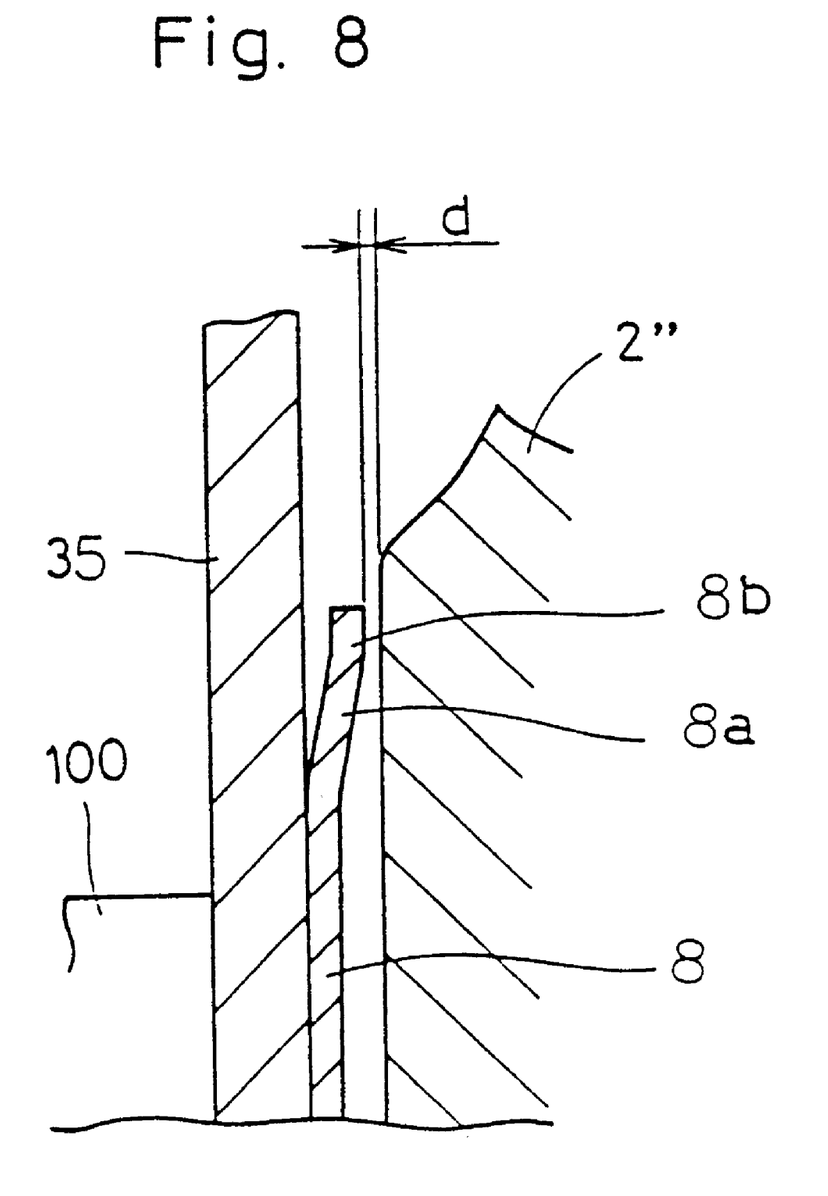
FIG. 8 is a fragmentary, cross section of a portion of the flywheel assembly depicted in FIG. 6, shown on an enlarged scale.

FIGS. 6, 7 and 8 show a flywheel assembly 121 of a third embodiment of the present invention. The flywheel assembly 121 is provided for transmitting a torque from a crankshaft 100 of an engine to a transmission (not shown) via a clutch apparatus. In FIG. 6, O—O represents a rotation axis of the flywheel assembly 121.

The flywheel assembly 121 is attached to an end of the crankshaft 100, and includes a flywheel 2" and a flexible plate 35.

The flexible plate 35 is made of, for instance, sheet metal. An inner peripheral portion of the flexible plate 35 is fixed to the crankshaft 100 by a plurality of bolts 5. An outer peripheral portion of the flexible plate 35 is fixed to the flywheel 2" by bolts 4. The flexible plate 35 is provided at its inner periphery with a cylindrical support portion 16' extending toward the transmission. The cylindrical support portion 16' has a corrugated form or section formed by drawing, as can be seen in FIG. 7, and portions of the cylindrical support portion 16' extend radially outward between the bolts 5. Portions of the cylindrical support portion 16' extend radially inward and have contact surfaces formed by cutting or machining. The contact surfaces of the support portion 16' engage a cylindrical portion 13 formed on the flywheel 2", as is explained in greater detail below.

The flexible plate 35 is provided at its radially middle portion with a plurality of circular holes 19 which are circumferentially equally spaced from each other. The rigidity in the bending direction of the flexible plate 35 can be adjusted by changing the number and size of the circular holes 19. The flexible plate 35 is provided at its outer periphery with an outer cylindrical portion 38 extending toward the engine. A ring gear 20 is welded to the outer periphery of the outer cylindrical portion 38.

The flywheel 2" is made of a substantially circular cast member. The flywheel 2" is provided at its radially outer portion with a friction surface 11, which is opposed to the transmission and is to be pressed against a friction facing (not shown) of a clutch disk assembly. The flywheel 2" is provided with air holes 12 which are located radially inside the friction surface 11. Each air hole 12 extends in the circumferential direction of the flywheel 2", and has a section diverging toward the engine. The air holes 12 are formed correspondingly to the circular holes 19, respectively. The flywheel 2" is further provided at its inner peripheral portion with bolt head escape holes 14 for avoiding interference with heads of the bolts 5. The flywheel 2" is provided at its inner periphery with a cylindrical portion 13 extending toward the engine. The cylindrical portion 13 is loosely fitted into the inner contact surfaces of the cylindrical support portion 16'. Since the flywheel 2 and the flexible plate 35 is centered each other in this manner, an additional member for centering can be eliminated.

A washer plate 8 is disposed between the inner peripheral portion of the flexible plate 35 and the inner peripheral portion of the flywheel 2". The washer plate 8 is in an annular form, and has an outer diameter larger than that or the end of the crankshaft 100. As shown, on an enlarged scale, in FIG. 8, a radially outer portion 8a of the washer plate 8 is bent at a predetermined angle toward the flywheel 2", and the outer peripheral portion of this radially outer portion is bent to form a flat surface 8b parallel to the side surface of the flywheel 2". The washer plate 8 is provided at its outer peripheral portion with a plurality of radial slits which are circumferentially equally spaced from each other. The flexible plate 35 is formed with a plurality of protrusions 37 which extend between the slits. Owing to the above structure, the washer plate 8 has a high rigidity in the clutch release operation direction (axial direction), and has a low rigidity in the bending direction. However, the radially outer portion 8a has the rigidity in the axial direction which is higher than that in the axial direction of the flexible plate 35.

In the above structure, the washer plate 8 has an outer diameter larger than the outer diameter of the end of the crankshaft 100, whereby deformation of the flexible plate 35 is suppressed, and it is possible to disperse or distribute the maximum stress in the flexible plate 35, which may appear at its portion joined to the outer peripheral portion of the crankshaft 100. Since the washer plate 8 has the flat surface 8b at its radially outer end, the washer plate 8 is always brought into stable contact with the side surface of the flywheel 2" when a large bending vibration occurs. Therefore, it is possible to suppress change in magnitude of the contact friction over time.

The flexible plate 35 and the flywheel 2" are arranged such that a gap D is formed between the cylindrical support portion 16' and the side surface of the flywheel 2". In the assembled state, the flat surface 8b of the washer plate 8 is not in contact with the side surface of the flywheel 2", and thus a gap d (see FIG. 8) is ensured. The gap d is smaller than the gap D.

Air which flows through air holes 12 and circular holes 19 formed at the flywheel 2" and the flexible plate 35, respectively, cools the flywheel 2". Therefore, the flywheel 2" is suppressed from attaining a high temperature even when a friction heat is generated at the friction surface 11. Therefore, it is possible to suppress abnormal wear of the friction facing and early deterioration of intended characteristics, which may be caused by the heat.

The operation of the flywheel assembly 121 will be described below.

Damping of Bending Vibration

When a bending vibration is transmitted form the crankshaft 100 of the engine to the flywheel assembly 121, the flexible plate 35 and the washer plate 8 bend in the bending direction to cause frictional sliding between the cylindrical support portion 16' and the cylindrical portion 13, so that the bending vibration is rapidly damped. Thereby, noises during acceleration are suppressed. Further, deviation rotation of the flywheel 2" in the inclined state is suppressed, so that local wearing of the unillustrated friction facing of the clutch disk assembly can be suppressed.

When the flexible plate 35 is bent only to a small extent, it provides low-rigidity characteristics depending on the initial loads of the flexible plate 35 and the washer plate 8. Particularly, a reduced thickness of the flexible plate 35 and provision of the circular holes 19 further reduce the rigidity.

When the flexible plate 35 is bent only to a small extent, it provides characteristics depending on the initial loads of the flexible plate 35 and the washer plate 8.

When the flexible plate 35 bends to a large extent, the flat surface 8b of the washer plate 8 is brought into contact with the side surface of the flywheel 2". Thereafter, the characteristics depend on the rigidity on the washer plate 8 in addition to the elastic characteristics of the flexible plate 35. Further, friction is caused by contact between the flat surface 8b of the washer plate 8 and the flywheel 2". This friction damps the bending vibration.

When the flexible plate 35 further bends, the end of the cylindrical support portion 16' is brought into contact with the side surface of the flywheel 2". Owing to provision of the washer plate 8 and the cylindrical support portion 16', it is possible to prevent excessive movement of the flexible plate 35 which may be caused by the bending vibration due to combustion of the engine. Consequently, the stress does not increase excessively, and thus the flexible plate 35 can have a long life-time.

Bearing of Release Load

In the operation of releasing or disengaging the clutch, a release load acts on the flywheel 2". The flywheel 2" moves, e.g., toward the engine, and thereby axially deforms the flexible plate 35. The flywheel 2" is then brought into contact with the washer plate 8 and thereby deforms the flexible plate 35 and the washer plate 8. Ultimately, the flywheel 2" is brought into contact with the cylindrical support portion 16' of the flexible plate 35. In this state, the release load of the flywheel 2" acts on the crankshaft 100 via the cylindrical support portion 16'. By reducing the axial movement of the flywheel 2" in this manner, the disengaging efficiency of the clutch is improved. Therefore, the flexible plate 35 can be thinner than that in the prior art. Consequently, the flexible plate 35 can have an improved damping function.

Other Effects

Since the cylindrical support portion 16' is formed by drawing, it has a generally high rigidity. Therefore, its radial thickness can be smaller than that in the prior art. Consequently, the cylindrical support portion 16' can be arranged at a small gap between the cylindrical portion 13 and the bolts 5. Further, the portions of the cylindrical support portion 16' which are shifted radially outward are located circumferentially between the bolts 5, so that the cylindrical support portion 16' can have a large diameter, and can be located at the same side as the bolts 5. In this manner, the cylindrical support portion 16' can be arranged in an optimum manner at a small space between the bolts 5 and the cylindrical portion 13.

According to the flywheel assembly of the invention, since the cylindrical support portion of the flexible plate radially overlaps the cylindrical portion of the flywheel, the flexible plate restricts radial movement and inclination of the flywheel. Consequently, rotation of the flywheel in an inclined state can be suppressed.

According to the structure in which the cylindrical portion and the cylindrical support portion are in contact with each other, the accuracy of centering between the flywheel and the flexible plate can be improved.

Since the cylindrical portion and the cylindrical support portion are arranged to cause frictional sliding therebetween in accordance with relative movement between the flexible plate and the flywheel, the cylindrical portion and the cylindrical support portion frictionally slide on each other when the flywheel assembly receives the bending vibration, so that the bending vibration can be rapidly damped.

According to the structure in which the cylindrical support portion has the corrugated section formed by drawing, the cylindrical support portion has a higher rigidity, so that the radial thickness of the cylindrical support portion can be reduced.

According to the structure in which the cylindrical support portion has the inner peripheral surface forming the contact surface in contact with the outer peripheral surface the cylindrical portion, the accuracy of centering between the flexible plate and the flywheel is improved.

According to the structure in which the portions of the cylindrical support portion which are shifted radially outward are arranged between the fixing members, the cylindrical support portion can be arranged closer to the fixing members, so that the space can be utilized efficiently.

The cylindrical support portion 16' restricts the radial movement and inclination of the flywheel 2". Therefore, deflective rotation of the flywheel 2" in the inclined state can be suppressed. Further, even when the flexible plate 35 is cut or broken, the flywheel 2" will be supported by the cylindrical support portion 16', and thus will be suppressed from radially disengaging.

Since the cylindrical support portion 16' is formed by drawing, it has a high rigidity. Therefore, its radial thickness can be smaller than that in the prior art. Further, the portions of the cylindrical support portion which are shifted radially outward are arranged circumferentially between the bolts 5, so that the cylindrical support portion 16' having a large diameter can be arranged close to the bolts 5. In this manner, the cylindrical support portion 16' can be arranged a small axial gap between the cylindrical portion 13 and the bolts 5, and thus a space can be effectively utilized.

According to the flywheel assembly of the invention, when a release load acts on the flywheel, the flywheel moves toward the engine. When the elastic member is compressed between the flexible plate and the flywheel, a high rigidity is exhibited. When the flywheel further moves axially, the flywheel is brought into contact with the projection of the flexible plate. Since the axial movement of the flywheel is restricted in this manner, the disengaging efficiency of the clutch is improved.

Fourth Embodiment

Figure 9:
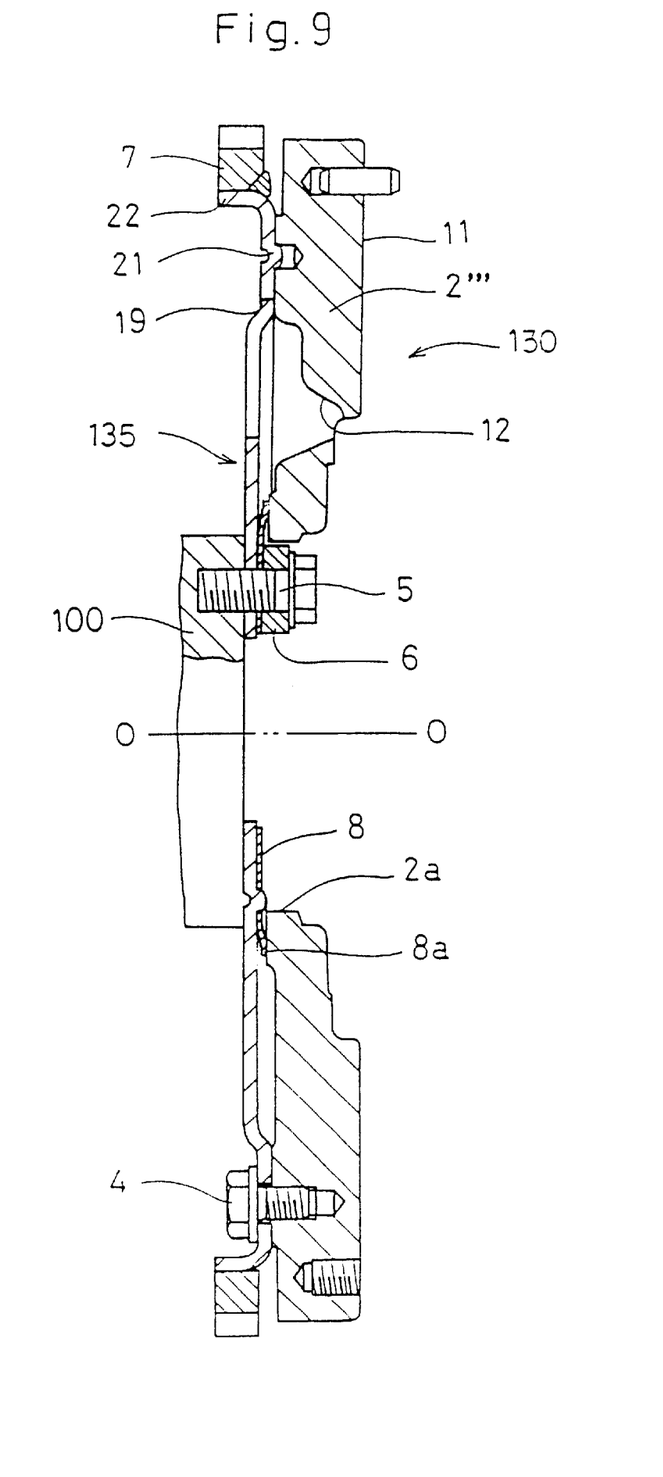
FIG. 9 is a fragmentary schematic cross section of a flywheel assembly in accordance with a fourth embodiment of the present invention.
Figure 10:
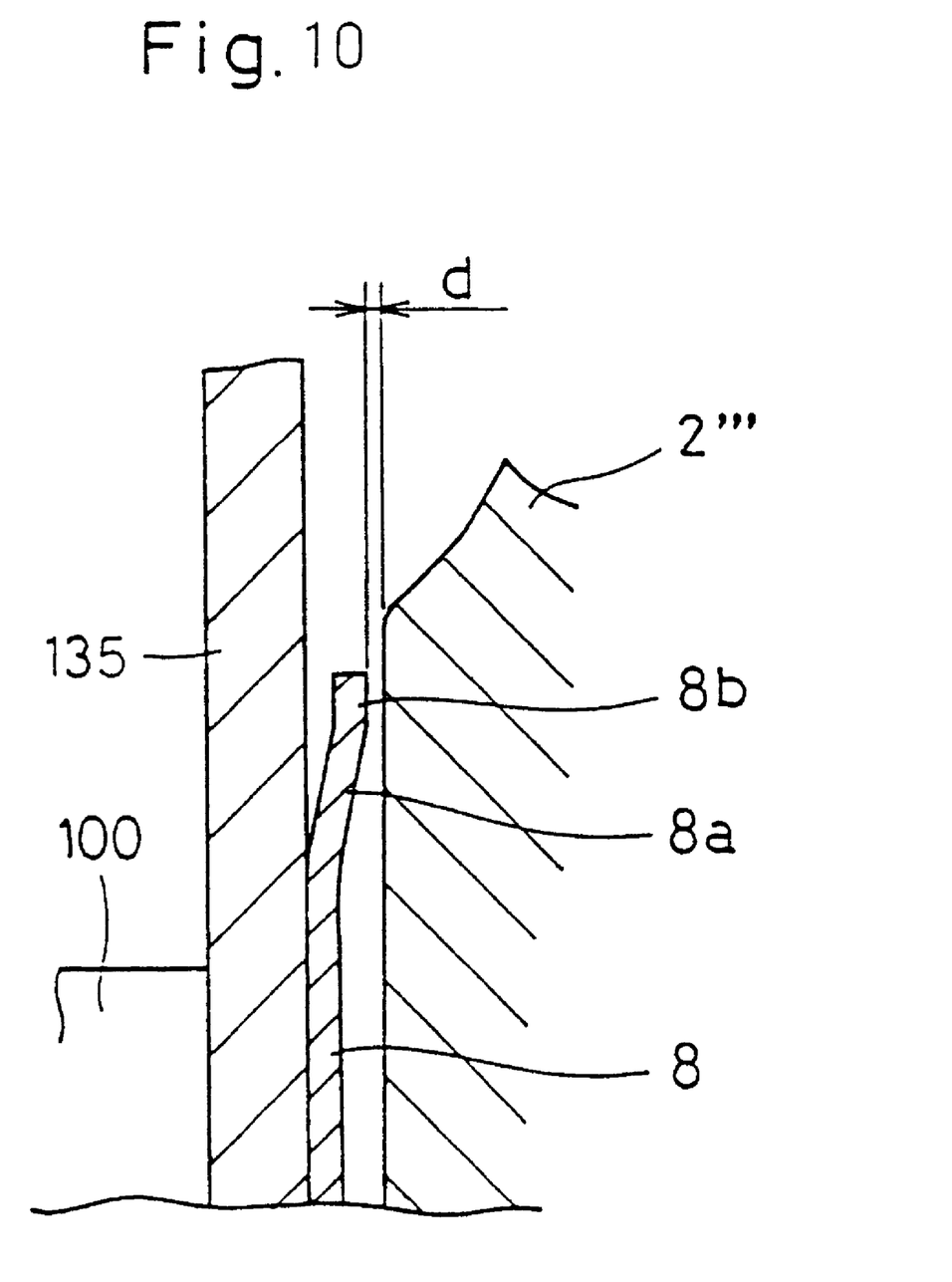
FIG. 10 is a fragmentary, cross section of a portion of the flywheel assembly depicted in FIG. 9, shown on an enlarged scale.

As shown in FIGS. 9 and 10, the flywheel assembly 130 is attached to an end of the crankshaft 100, and is basically formed of a flexible plate 135 and a flywheel 2'". The flexible plate 135 is made of a circular metal sheet. An inner peripheral portion of the flexible plate 135 is fixed to the crankshaft 100 by bolts 5. A thick washer 6 is interposed between a head of each bolt 5 and the flexible plate 135. The bolts 5 and the washers 6 are circumferentially equally spaced from each other.

An outer peripheral portion of the flexible plate 135 is fixed to an outer peripheral portion of the flywheel 2'" by bolts 4. The flexible plate 135 is provided at its radially middle portion with a plurality of circular holes 19 which are circumferentially equally spaced from each other. At a portion radially outside the circular holes 19, the flexible plate 135 is provided with extruded portions 21 which extend toward the flywheel 2'". The flexible plate 135 is provided at its outer periphery with a cylindrical portion 22 extending toward the engine. A ring gear 7 is welded to the outer periphery of the cylindrical portion 22.

The flywheel 2'" is made of a substantially circular cast member. The flywheel 2'" has a central hole 2a, of which surface is close to or in contact with radially outer portions of the washers 6. The flywheel 2'" is provided at its radially outer portion with a friction surface 11, which is opposed to the transmission and is to be pressed against a friction facing (not shown) of a clutch disk assembly of the clutch apparatus. The flywheel 2'" is provided with air holes 12 which are located radially inside the friction surface 11 and are circumferentially equally spaced from each other. Each air hole 12 extends in the circumferential direction of the flywheel 2'", and has a section diverging toward the engine. The air holes 12 are formed correspondingly to the circular holes 19 of the flexible plate 135, respectively.

A washer plate 8 is disposed between the inner peripheral portion of the flexible plate 135 and the inner peripheral portion of the flywheel 2'". The washer plate 8 is in an annular form, and has an outer diameter larger than that of the end of the crankshaft 100. As shown, on an enlarged scale, in FIG. 10, a radially outer portion 8a of the washer plate 8 is bent at a predetermined angle toward the flywheel 2'", and the outer peripheral portion of this radially outer portion is bent to form a flat surface 8b parallel to the side surface of the flywheel 2'". The flat surface 8b is not in contact with the side surface of the flywheel 2'", and thus a gap d is ensured therebetween. The washer plate 8 is provided at its outer peripheral portion with a plurality of radial slits which are circumferentially equally spaced from each other. Owing to the above structure, the washer plate 8 has a high rigidity in the clutch release operation direction (axial direction), and has a low rigidity in the bending direction. However, the radially outer portion 8a has the rigidity in the axial direction which is higher than that in the axial direction of the flexible plate 135.

In the above structure, the washer plate 8 has the outer diameter larger than the outer diameter of the end of the crankshaft 100, whereby deformation of the flexible plate 135 is suppressed, and it is possible to disperse or distribute the maximum stress in the flexible plate 135, which may appear at its portion joined to the outer peripheral portion of the crankshaft 100. Since the washer plate 8 has the flat surface 8b at its radially outer end, the washer plate 8 is always brought into stable contact with the side surface of the flywheel 2'" when a large bending vibration occurs. Therefore, it is possible to suppress change in magnitude of the contact friction over time.

Air which flows through air holes 12 and circular holes 19 formed at the flywheel 2'" and the flexible plate 135, respectively, cools the flywheel 2'". Therefore, the flywheel 2'" is suppressed from attaining a high temperature even when a friction heat is generated at the friction surface 11. Therefore, it is possible to suppress abnormal wear of the friction facing and early deterioration of intended characteristics, which may be caused by the heat.

An operation of the flywheel assembly 130 will be described below.

Damping of Bending Vibration

When a bending vibration is transmitted form the crankshaft 100 of the engine to the flywheel assembly 130, the flexible plate 135 and the washer plate 8 bend to absorb the bending vibration. Thereby, noises during acceleration are suppressed. Further, deviation rotation of the flywheel 2'" in the inclined state is suppressed, so that local swearing of the unillustrated friction facing of the clutch disk assembly can be suppressed.

When the flexible plate 135 is bent only to a small extent, the flat surface 8b of the washer plate 8 is not in contact with the washer plate 8, so that it provides characteristics depending on the initial loads of the flexible plate 135 and the washer plate 8.

When the flexible plate 135 bends to a large extent, the flat surface 8b of the washer plate 8 is brought into contact with the side surface of the flywheel 2'". Thereafter, he characteristics depend on the rigidity on the washer plate 8 in addition to the elastic characteristics of the flexible plate 135. Further, friction occurs between the flat surface 8b of the washer plate 8 and the flywheel 2'".

Bearing of Release Load

When a release load acts on the flywheel 2'", the flywheel 2'" moves toward the engine. Thereby, the side surface of the flywheel 2'" is brought into contact with the flat surface 8b of the washer plate 8. In this state, the release load of the flywheel 2'" acts on the crankshaft 100 via the washer plate 8 having a high rigidity in the axial direction. Since the washer plate 8 restricts the axial movement of the flywheel 2'" in this manner, the disengaging efficiency of the clutch is improved.

The inner peripheral surface of the central hole of the flywheel 2'" is close to or in contact with the outer peripheries of the washers 6, the radial movement, inclination and others are restricted. Particularly, deflection rotation of the flywheel 2'" due to imbalance is prevented, so that a vibration can be suppressed. Further, even when the flexible plate 135 is cut or broken, the flywheel 2'" will be suppressed from radially disengaging because the washers 6 restricts the radial movement of the flywheel 2'".

Fifth Embodiment

Figure 11:
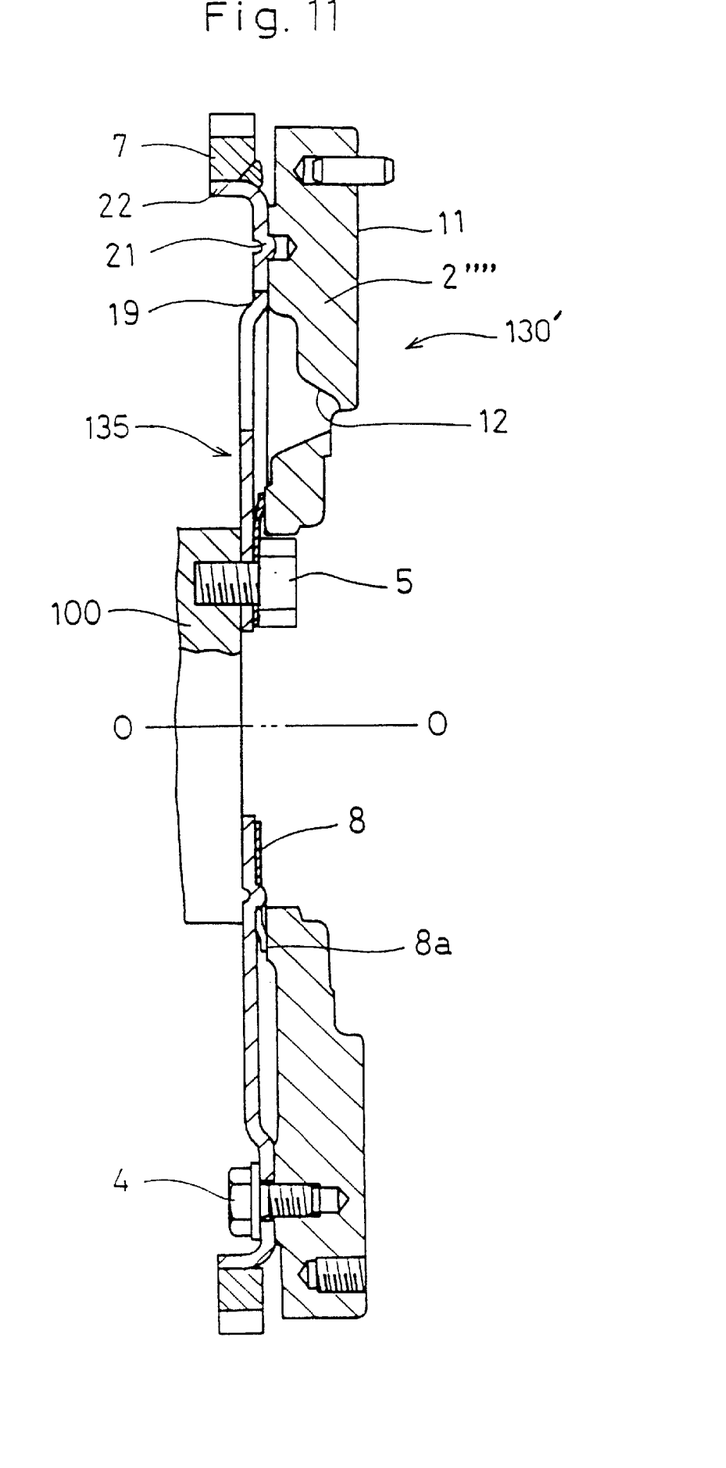
FIG. 11 is a fragmentary schematic cross section of a flywheel assembly in accordance with a fifth embodiment of the present invention.

As shown in FIG. 11, the washer 6 described above with respect to the fourth embodiment may be eliminated, and the heads of the bolts may be in contact with or close to the inner peripheral surface of the flywheel 2'". This structure can also achieve an effect similar to that by the foregoing embodiment. According to the flywheel assembly 130' in FIG. 11 of the present invention, the radial movement of the rotating flywheel is restricted by the plurality of fixing members arranged circumferentially in the central hole, so that inclination such as deflection rotation can be suppressed.

The plurality of fixing members may be washers which are disposed between the heads of bolts and the inner peripheral portion of the flexible plate and are located radially inside the inner peripheral surface of the flywheel, or may be the heads of bolts.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed:

1. A flywheel assembly for transmitting torque from a crankshaft, comprising:

a flexible plate having a circular plate body having flexibility in a bending direction and an annular portion formed proximate an outer periphery of said flexible plate, said annular portion being offset from said circular plate body in an axial direction, said annular portion extending from said circular plate body and away from the crankshaft, said annular portion being formed with at least one protrusion that extends in an axial direction away from the crankshaft; and a flywheel having an outer peripheral portion fixed to said annular portion such that there is an axial gap between said circular plate body and a radially inward portion of said flywheel, said outer peripheral portion of said flywheel being formed with at least one aperture located such that said protrusion extends into said aperture.

2. The flywheel assembly as set forth in claim 1, further comprising a washer disposed between said radially inner portion of said flywheel and an inner peripheral portion of said circular plate body, said washer and said circular plate body being adapted for mounting to the crankshaft.

3. The flywheel assembly as set forth in claim 2, wherein a radially outward portion of said washer is spaced apart from said radially inner portion of said flywheel with said flexible plate and said flywheel in a torsion free state.

4. The flywheel assembly as set forth in claim 3, wherein said flywheel is bolted to said annular portion.

5. The flywheel assembly as set forth in claim 1, wherein said protrusion extends into said aperture in said flywheel to thereby assist in co-axially aligning said flexible plate and said flywheel.

* * * * *